3,385,831
TEXTILE FIBERS OF POLYETHYLENE TEREPHTHALATE/HEXAHYDROTEREPHTHALATE COPOLYESTER
William H. Watson, Grifton, N.C., assignor to E. I. du Pont de Nemours and Company, Wilmington, Del., a corporation of Delaware
No Drawing. Continuation-in-part of application Ser. No. 298,595, July 30, 1963. This application Feb. 6, 1967, Ser. No. 614,025
3 Claims. (Cl. 260—75)

ABSTRACT OF THE DISCLOSURE

Linear condensation copolyester fibers for use in textile fabric are disclosed to be an improvement over conventional polyethylene terephthalate fibers. The copolyester fibers differ from the conventional fibers in having 8 to 18 mol percent of the terephthalic acid component replaced by hexahydroterephthalate components. The fibers possess enhanced dyeability and good over-all physical properties, with absolute shrinkage values at 196° C. of not more than about 5% higher than comparable fibers of polyethylene terephthalate homopolyester. Fabric prepared from the fibers exhibits superior wash-wear performance.

CROSS-REFERENCE TO A RELATED APPLICATION

This is a continuation-in-part of my application Ser. No. 298,595 filed July 30, 1963, now abandoned.

BACKGROUND OF THE INVENTION

This invention relates to novel fibers for textile fabrics.

Fibers of polyethylene terephthalate have achieved wide commercial success owing to their adaptability for preparing "wash-and-wear" fabrics requiring only minimum care. Copolyesters have also been suggested from time to time involving substitution of part of the terephthalic acid by sebacic acid, isophthalic acid, hexahydroterephthalic acid, or other dicarboxylic acids. The addition of a copolymeric component has been found to result in considerable modification of the properties of the polyethylene terephthalate. A desirable effect is a marked improvement in dyeability; however, fibers of the copolyesters exhibit poorer wash-wear performance than fibers of polyethylene terephthalate, and many other properties of the fibers are adversely affected. In particular, it has been found that the ability of the fibers to withstand treatment at high temperature is reduced by the presence of the copolymeric component. In general, high shrinkage is encountered when the copolyester fibers are subjected to fabric treatments at temperatures on the order of 196° C.

A fiber composed of a copolyester of polyethylene terephthalate has now been produced which displays enhanced dyeability as contrasted with polyethylene terephthalate while yet retaining the ability to withstand treatment at high temperature and exhibiting good shape retention in fabric form and other desirable physical properties of polyethylene terephthalate fibers. The novel fiber comprises a copolyester of ethylene glycol, terephthalic acid, and hexahydroterephthalic acid falling within a critical range of terephthalate/hexahydroterephthalate content and further characterized by critical fiber structural parameters of orientation and crystallinity.

Surprisingly, substitution of the same molar quantities of other dicarboxylic acids for the hexahydroterephthalic acid in the novel fiber of the invention does not result in acceptable fiber properties. Polyethylene terephthalate/hexahydroterephthalate fibers outside the critical range of copolymeric composition and fiber structural parameters of crystallinity and orientation also are characterized by poorer properties than those of the fiber of the invention.

SUMMARY OF THE INVENTION

The novel fiber of the invention is a tenacious linear condensation copolyester fiber for textile fabric having a tenacity of at least 2.5 grams per denier at break; having a high crystallinity as characterized by a crystallinity index of at least about 12; and having an orientation level characterized by a birefringence of at least about 0.16 and a sonic velocity value of less than 3.5 kilometers per second; said copolyester being composed, to the extent of at least 95 mol percent, of polyethylene terephthalate/hexahydroterephthalate of 82 to 92 mol percent terephthalic acid and 18 to 8 mol percent hexahydroterephthalic acid components. Suprisingly, the fibers of the invention not only possess enhanced dyeability and good over-all physical properties, with absolute shrinkage values at 196° C. not more than about 5% higher than comparable fibers of polyethylene terephthalate homopolyester, but also exhibit in fabric form a level of wash-wear performance actually superior to that of fabrics of polyethylene terephthalate.

DESCRIPTION OF PREFERRED EMBODIMENTS OF THE INVENTION

As disclosed by Hebeler in his U.S. Patent 3,044,250, polyethylene terephthalate fibers destined for blending with cotton are desirably produced by drawing and then heat treating at constant length to enhance their load-bearing capacity at 7% elongation and thereby improve their ability to reinforce the strength of the cotton fibers, which exhibit a break elongation of about 7%. Load-bearing capacity at 7% elongation is hereinafter designated by the symbol $T_7$. $T_7$ values for conventional polyethylene terephthalate fibers are normally in the range of 1–2 g.p.d., while high $T_7$ fibers (i.e., fibers having enhanced $T_7$ values) adapted for blending with cotton are characterized by $T_7$ values of at least 2.1 g.p.d. and preferably about 2.5 g.p.d. or higher. The conversion of polyethylene terephthalate to high $T_7$ fibers is accompanied by an especially serious decline in dyeability. The novel fibers of the invention are readily converted to high $T_7$ fibers, and because of their enhanced dyeability with respect to polyethylene terephthalate the high $T_7$ fibers of polyethylene terephthalate/hexahydroterephthalate containing 8 to 18 mol percent hexahydroterephthalate represent a preferred form of the invention.

Under normal circumstances, the rate at which polyethylene terephthalate fiber adsorbs dye is quite low. To accelerate dye pick-up on fiber, a "carrier" such as o-phenylphenol is customarily added to the dye bath when dyeing polyethylene terephthalate fiber. This adds greatly to the cost of dyeing and is undesirable for other reasons as well. Surprisingly, it has been found that one particularly preferred embodiment of the present invention possesses dyeability enhanced to a level which permits dyeing at the boil without a carrier. This property is exhibited by a fiber composed of a linear condensation copolyester of ethylene glycol and a mixture of dicarboxylic acids comprising 83.0 mol percent terephthalic acid and 17.0 mol percent hexahydroterephthalic acid. The percentage composition should not deviate more than 1.0 mol percent from the given values, since with a lower ratio of hexahydroterephthalic acid the fiber requires some carrier for dyeability at a commercially acceptable rate; while with a higher ratio of hexahydroterephthalic acid the fiber has unacceptable shrinkage when exposed to high temperatures.

Although the term "copolyester," as used herein, implies that either the glycol or acid component of the polyester is a mixture of at least two compounds, an additional compound may also be present so that terpolyesters, etc. are comprehended by the term. The copolyesters from which the fibers of the invention are formed may therefore, in their broadest scope, be a linear condensation polyester of ethylene glycol and a mixture of acids comprising terephthalic acid and hexahydroterephthalic acid in molar proportions of 82/18 to 92/8, and up to 5 mol percent of another dicarboxylic acid such as isophthalic acid, the sum of dicarboxylic acids totalling 100 mol percent. Of course, a small part of the ethylene glycol may be replaced by the corresponding mol percentage of another glycol. Copolymeric compositions are specified herein by listing the respective mol percentage values for each constituent of the mixed component. For instance, polyethylene terephthalate/hexahydroterephthalate/sebacate (88/8/4) represents a copolyester derived from ethylene glycol and a mixture of 88 mol percent terephthalic acid, 8 mol percent hexahydroterephthalic acid, and 4 mol percent sebacic acid which may be prepared, spun, and drawn to form fibers having a birefringence of at least about 0.16, a sonic velocity value of less than 3.5 kilometers per second, and a crystallinity index of at least about 12 in accordance with the invention.

The following examples will serve to illustrate the invention further; however, they are not intended to be limitative. In the examples, birefringence values reported for the fibers are Berek compensator values. The crystallinity index is determined in accordance with the method described by Statton in Journal of Applied Polymer Science, vol. 7, pp. 803–815 (1963), employing an amorphous, unoriented film of polyethylene terephthalate as a standard for minimum crystallinity and the same film heated at 245° for 65 hours in air as a standard for maximum crystallinity.

The term "sonic velocity" used herein is a polymer structural parameter related to molecular orientation along the fiber axis with higher values of sonic velocity indicating a higher degree of orientation. Sonic velocity relationships and test procedures are described by Charch and Mosely in the Textile Research Journal, vol. 29, page 525 (July 1959). Briefly, sonic velocity, in km./sec., is measured by passing a sound wave having a frequency of 10,000 cycles per second for a known distance through the polymer structure using apparatus known in the art. The sonic velocity values reported herein were measured with the filaments held under a stretching tension of 0.7 gram per denier. The fibers of this invention have sonic velocity values of less than 3.5 kilometers per second.

Example 1.—Fiber preparation and properties; effect of copolymer composition on high temperature shrinkage Polyethylene terephthalate / hexahydroterephthalate (90/10) having a relative viscosity of 27 and containing 0.3% $TiO_2$ is spun by conventional techniques at 286° C. at a spinning speed of 1200 y.p.m. to form a yarn containing 34 round filaments. The yarn is drawn by passing it from a feed roll around the curved faces of a heating block equipped with an idler roll at each end and maintained at 97° C., taking six wraps of the yarn around the block, and then around the draw pin, draw roll, and associated separator roll. The draw speed is 454 y.p.m. and the draw ratio is 3.6. From the draw roll the yarn is passed at the same speed around a curve block heated at 170° C. and equipped with an idler roll at one end and a driven roll at the other, taking six wraps of the yarn around the block, after which it is wound up on a suitable package. The drawn yarn has a crystallinity index of 14.5, a sonic velocity value of 3.18 kilometers per second, a birefringence of 0.20, a denier of 71 (7.9 tex.), a tenacity of 4.7 g.p.d., an elongation of 20%, a yield point of 2.4 g.p.d., and an initial modulus of 110 g.p.d. When heated at 196° C., it shrinks 14.5%. The heat-treated yarn remains tenacious.

The example is repeated, employing as starting materials polyethylene terephthalate/hexahydroterephthalate copolyesters having mol ratios of 92/8, 85/15, 84/16, 83/17, and 82/18 terephthalate (T) to hexahydroterephthalate (HT). Each of the drawn yarns has a crystallinity index within the range 14.5 to 20.5 and a birefringence within the range 0.19 to 0.21. The tenacities range from 3.6 to 4.8 g.p.d., the elongations from 19 to 27%, the yield points from 1.4 to 2.4 g.p.d., and the initial moduli from 80 to 110 g.p.d. The shrinkages of the yarns at 196° C. are listed in Table I below. Also listed are the 196° C. shrinkages of a polyethylene terephthalate yarn and a polyethylene terephthalate/hexahydroterephthalate (80/20) yarn prepared as comparative examples, employing the same procedure used to prepare the other yarns.

TABLE I.—196° C. SHRINKAGE OF POLYETHYLENE TEREPHTHALATE/HEXAHYDROTEREPHTHALATE YARNS

| Composition T/HT ratio: | 196° C. Shrinkage, percent |
| --- | --- |
| 92/8 | 14 |
| 90/10 | 14.5 |
| 85/15 | 15 |
| 84/16 | 17 |
| 83/17 | 17 |
| 82/18 | 16 |
| Comparative examples: | |
| 100/0 | 13 |
| 80/20 | 24 |

As shown in the table, yarns composed of copolyesters of terephthalic acid and up to about 18 mol percent hexahydroterephthalic acid have 196° C. shrinkage values within 5% of the shrinkage of the polyethylene terephthalate control yarn. In each instance, these yarns remain tenacious after heat treatment at 196° C. Beginning at the level of about 18 mol percent hexahydroterephthalate there is a sharp increase in shrinkage, and at the level of 20 mol percent hexahydroterephthalate the 196° C. shrinkage already has an absolute value more than 10% higher than the shrinkage of the polyethylene terephthalate control yarn.

Example 2.—Dyeability of polyethylene terephthalate/hexahydroterephthalate fibers The yarns of Example 1 are dyed, employing an aqueous dispersion of 6% (based on the weight of the fiber) of a violet disperse dyestuff comprising 1,4-diamino-2,3-dichloroanthraquinone at 100° C. for 90 minutes, using a 40 to 1 ratio of bath to fiber. The copolyester yarn containing 8 mol percent hexahydroterephthalate yields a light to medium shade of violet, markedly deeper than an unmodified polyethylene terephthalate control yarn prepared and dyed under the same conditions. The dye sorption on fiber is 2.0% for the copolyester yarn containing 8 mol percent hexahydroterephthalate as contrasted with only 1.0% for the unmodified polyethylene terephthalate yarn.

The dyeability of the copolyester yarns increases markedly with increasing hexahydroterephthalic content. The copolyester yarn containing 17 mol percent hexahydroterephthalate has excellent dyeability, being dyed to a deep shade of violet, and is rated as dyeable at the boil without carrier. The copolyester yarns containing 16 mol percent and 18 mol percent hexahydroterephthalate are similar to the yarn containing 17 mol percent hexahydroterephthalate, having slightly lighter and slightly deeper shades, respectively.

Similar results are obtained by dyeing the series of copolyester yarns at 100° C. for 90 minutes with an aqueous dispersion of 12% (based on the weight of the fiber) of a blue disperse dyestuff having the following formula:

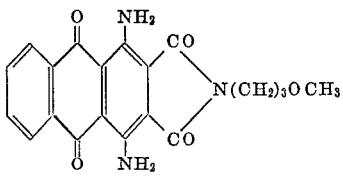

The copolyester yarn containing 8 mol percent hexahydroterephthalate yields a medium shade of blue, markedly deeper than an unmodified polyethylene terephthalate control yarn prepared and dyed under the same conditions, which is dyed only a light shade of blue. A still deeper shade of blue is achieved on the yarn containing 15 mol percent hexahydroterephthalate, and at 17 mol percent hexahydroterephthalate content in the fiber, the yarn is rated dyeable at the boil without carrier. Values for dye sorption on fiber for the blue disperse dye are listed in Table II.

TABLE II.—DYE SORPTION ON FIBER OF POLYETHYLENE TEREPHTHALATE/HEXAHYDROTEREPHTHALATE YARNS

| Composition T/HT ratio: | Dye sorption of blue disperse dye on fiber, percent |
| --- | --- |
| 100/0 (Control) | 2 |
| 92/8 | 4 |
| 85/15 | 6 |
| 83/17 | 10.5 |

To achieve 10–11% dye sorption on the control yarn of unmodified polyethylene terephthalate, as required for the development of deep shades of color, it is found that the addition to the dye bath of 5 g.p.l. of o-phenylphenol as a carrier is required, the time of dyeing and other dyeing conditions being maintained constant. Copolyester yarns acceptable for rating as "dyeable at the boil," i.e., dyeable to deep shades of color in aqueous dyebaths at 100° C. in the absence of a carrier within a normal dyeing time of about 1 to 2 hours, fall within a narrow range of 17 ±1.0 mol percent hexahydroterephthalate content; since yarns containing less than 16 mol percent hexahydroterephthalate are insufficiently dyeable while yarns containing more than 18 mol percent hexahydroterephthalate are too severely shrunk at high temperature for commercial acceptability as shown in Example 1.

All the fibers within the scope of the invention are found to be resistant to alkaline hydrolysis, the rate of weight loss in a boiling 3% solution of sodium hydroxide in water varying from only 0.2% per minute for yarn containing 8 mol percent hexahydroterephthalate (0.18% per minute for unmodified polyethylene terephthalate control yarn) to 0.31% per minute for yarn containing 18 mol percent hexahydroterephthalate. It is observed that for yarn containing 20 mol percent hexahydroterephthalate the alkaline hydrolysis rate jumps to 0.40% per minute.

Example 3.—Wash-wear performance of polyethylene terephthalate/hexahydroterephthalate fabrics The yarns of Example 1 are woven to taffeta fabrics having a construction of 114 ends x 85 picks per inch, after which the fabrics are finished conventionally and evaluated for wash-wear performance. The wash-wear rating of the fabrics is carried out by washing the fabrics in a home model washing machine using water at 55° C. with a commercially available detergent for home laundry use, rinsing the fabric in water at 55° C., and tumbling the fabrics dry in an automatic dryer at 70° C. The fabrics are allowed to hang 1.5 hours and are then evaluated by a group of persons on an arbitrary subjective scale using the following ratings:

5 represents a perfectly flat fabric
4 represents a fabric deviating only slightly from flat
3 represents a fabric acceptable for wearing without ironing
2 represents a fabric of borderline acceptability for wearing without ironing, easily "touched up"
1 represents a fabric unacceptably wrinkled for wearing without ironing.

The average ratings determined in this way are reported in Table III. As shown in the table, fabrics woven of yarns containing from 8 to 18 mol percent hexahydroterephthalate content are significantly superior in wash-wear performance to a control fabric of unmodified polyethylene terephthalate fibers spun and drawn in the same way as the copolyester fibers.

TABLE III.—RATING OF FABRICS WASHED AT 55° C. AND DRIED AT 70° C.

| Composition T/HT ratio: | Wash-wear rating |
| --- | --- |
| 100/0 (Control) | 2.1 |
| 92/8 | 2.4 |
| 85/15 | 2.7 |
| 82/18 | 2.7 |

Example 4.—Preparation of high $T_7$ yarn

Polyethylene terephthalate/hexahydroterephthalate (90/10) having a relative viscosity of 17.2 is spun by conventional techniques at 285° C. with a spinning speed of 1600 y.p.m. to form filaments having an as-spun denier of 5.0 (0.6 tex.). A tow is formed by combining 3200 of the spun filaments. The tow is passed from a series of feed rolls through water at 90° C. to a series of draw rolls maintained at a peripheral speed of 33.3 y.p.m. The draw ratio is 3.39. The drawn tow is passed into an oven where the air is maintained at a temperature of 180° C., the tow being passed around roller bars in such a way as to maintain a residence time of the tow in the oven of 24 seconds. The relaxation permitted of the tow in the oven is only 1.0%. The filaments in the drawn, heat-treated tow have a crystallinity index of 31.4, a birefringence of 0.193, a $T_7$ value of 4.0 g.p.d., a tenacity of 4.2 g.p.d. (tenacity at break), an elongation of 10%, an initial modulus of 95 g.p.d., and a 196° C. shrinkage of 14.5%. The fibers are resistant to alkaline hydrolysis, the rate of weight loss being only 0.2%. A sample of the fibers is dyed for 90 minutes in a bath at 100° C. containing 4% (based on the weight of the fiber) of 1,4-diamino-2,3-dichloroanthraquinone and 2 grams per liter of o-phenylphenol as a carrier, using a 30 to 1 ratio of bath to fiber. The fibers are dyed to a medium shade of violet the dye sorption on the fiber being 2.6%.

Example 5.—Substitution of a terpolymeric component for a portion of the hexahydroterephthalate content Polyethylene terephthalate/hexahydroterephthalate/isophthalate (85/10/5) is spun and drawn as in Example 1. The drawn yarn has a crystallinity index of about 15, a birefringence of about 0.16, a tenacity of 4.0 g.p.d., an elongation of 30%, a yield point of 1.7 g.p.d., and an initial modulus of 98 g.p.d. The fibers are resistant to alkaline hydrolysis, the rate of weight loss being only 0.23% per minute in boiling 3% caustic. The wash rating of a fabric prepared from the yarn and having the same construction as the fabrics of Example 3 is 2.6. The yarn and fabric are dyed to a medium to deep shade of violet with 1,4 - diamino-2,3-dichloroanthraquinone, employing the same conditions used in Example 2. With the blue disperse dyestuff having the formula shown in Example 2, a medium to deep shade of blue is obtained.

Example 6.—Polyethylene terephthalate/hexahydroterephthalate contrasted with other copolyesters For comparative purposes, a series of high $T_7$ yarns is spun and drawn in accordance with the procedure of Example 4, employing unmodified polyethylene terephthalate homopolymer, polyethylene terephthalate/hexahydroterephthalate (90/10), polyethylene terephthalate/ isophthalate (90/10), and polyethylene terephthalate/ sebacate (90/10). In Table IV below are compared the properties of the yarns, identified by the designations 2G–T, 2G–T/HT, 2G–T/I, and 2G–T/S, respectively. For convenience in comparison, the levels of dyeability and alkaline hydrolysis of polyethylene terephthalate homopolymer are arbitrarily rated as unity in the table, and the corresponding values for the copolyesters are given as percentage increases with respect to the polyethylene terephthalate. The yarns are dyed with an aqueous dispersion of 4% (based on the weight of the fiber) of a violet disperse dye comprising 1,4-diamino-2,3-dichloroanthraquinone for 90 minutes at 100° C. with the addition of 2 grams per liter of o-phenylphenol, using a 30 to 1 ratio of bath to fiber.

TABLE IV.—COMPARISON OF POLYETHYLENE TEREPHTHALATE HIGH $T_7$ YARN AND VARIOUS COPOLYESTER HIGH $T_7$ YARNS

| Property | 2G–T | 2G–T/HT (90/10) | 2G–T/I (90/10) | 2G–T/S (90/10) |
|---|---|---|---|---|
| 196° C. Shrinkage, percent | 10.1 | 14.5 | 21.7 | 24.1 |
| Dyeability Relative to 2GT percent |  | +78 | +55 | +62 |
| Alkaline Hydrolysis Relative to 2GT, percent |  | +9 | +20 | +30 |
| Tenacity, g.p.d. | 4.5 | 4.2 | 4.1 | 3.5 |
| $T_7$, g.p.d. | 4.2 | 4.0 | 3.9 | 2.9 |
| Birefringence | 0.218 | 0.193 | 0.203 | 0.201 |
| Crystallinity Index | 31.2 | 31.4 | 33.3 | 27.6 |

As shown in the table, modification of polyethylene terephthalate with other common copolymeric components such as isophthalate and sebacate leads to increases of more than 10% in absolute shrinkage as compared with an increase of less than 5% with hexahydroterephthalate, while the dyeability is not as good as that achieved with hexahydroterephthalate and the resistance to alkaline hydrolysis is decreased.

The same polymeric compositions are employed to prepare a series of yarns spun and drawn in general accordance with the procedure of Example 1. The yarns are woven to taffeta fabrics having a construction of 115 ends x 85 picks. The fabrics are finished conventionally and evaluated for wash-wear performance as in Example 3. The wash temperature is 57° C. The average ratings are reported in Table V.

TABLE V.—RATING OF FABRICS WASHED AT 57° C. AND DRIED AT 70° C.

| Composition: | Wash-wear rating |
|---|---|
| 2G–T | 1.9 |
| 2G–T/HT (90/10) | 2.7 |
| 2G–T/I (90/10) | 1.7 |
| 2G–T/S (90/10) | 2.0 |

As shown in the table, the fabric of polyethylene terephthalate/hexahydroterephthalate was superior to the polyethylene terephthalate fabric, while the fabrics of the other copolyesters were equivalent to or slightly inferior as compared with the polyethylene terephthalate fabric.

Example 7.—Polyethylene terephthalate/hexahydroterephthalate fibers having structures outside the scope of the invention Polyethylene terephthalate / hexahydroterephthalate (90/10) having a relative viscosity of 25 and containing 0.3% $TiO_2$ is spun at 6,000 y.p.m. in accordance with the procedure for spinning polyethylene terephthalate yarn described by Hebeler in his U.S. Patent 2,604,667. The product is a 17-filament yarn having a crystallinity index of less than 5, a birefringence of 0.06, a denier of 32 (3.4 tex.), a tenacity of 2.2 g.p.d., an elongation of 68%, a yield point of 0.70 g.p.d., and a modulus of 29 g.p.d. The yarn shrinks severely when heated, exhibiting a shrinkage of 45% at 160° C. and is so severely affected by heating at 196° C. that it disintegrates when handled.

Polyethylene terephthalate / hexahydroterephthalate (90/10) having a relative viscosity of 25 and containing 0.3% $TiO_2$ is spun at 3,840 y.p.m. in accordance with the procedure for spinning polyethylene terephthalate yarn described by Hebeler in his U.S. Patent 2,604,689. The product is a 17-filament yarn having a crystallinity index of less than 5, a birefringence of 0.044, a denier of 52 (5.8 tex.), a tenacity of 1.71 g.p.d., an elongation of 107%, a yield point of 0.52 g.p.d., and a modulus of 18 g.p.d. The yarn shrinks 73% at 160° C. and is so severely affected by heating at 196° C. that it disintegrates when handled.

Polyethylene terephthalate / hexahydroterephthalate (90/10) having a relative viscosity of 25 and containing 0.3% $TiO_2$ is spun at 666 y.p.m. to form a 34-filament, 293-denier (32.2 tex.) yarn. The spun yarn, which has a birefringence of 0.004, is drawn 4.0× in water at 40° C. in accordance with the procedure for spinning and drawing polyethylene terephthalate yarn described by Calton in U.S. Patent 2,734,794. The drawn yarn has a crystallinity index of 4 and a birefringence of 0.19. The yarn shrinks severely when heated, exhibiting a shrinkage of 50% at 150° C. After heating at 150° C., the yarn has a crystallinity index of 30 but a birefringence of only 0.15. It is quite brittle and exhibits a tenacity of less than 2 g.p.d. Upon further heating at 196° C., the yarn becomes so brittle that it disintegrates upon handling.

As shown by comparison of the results of the above example with the results of Example 1, the structure of the novel fiber of the invention is highly critical. In order to obtain fibers having textile properties of high utility, the orientation and crystallinity of the fiber as well as its copolymeric composition must be maintained within the limits defined hereinabove.

Since many different embodiments of the invention may be made without departing from the spirit and scope thereof, it is to be understood that the invention is not limited by the specific illustrations except to the extent defined in the following claims.

I claim

1. Tenacious linear condensation copolyester fiber for textile fabric, characterized by a tenacity of at least 2.5 grams per denier at break, a crystallinity index of at least 12, a birefringence of at least 0.16, and a sonic velocity value of less than 3.5 kilometers per second when measured under a tension of 0.7 gram per denier; said copolyester consisting of polyethylene terephthalate/ hexahydroterephthalate of 82 to 92 mol percent terephthalic acid/18 to 8 mol percent hexahydroterephthalic acid components.

2. Fiber as defined in claim 1 composed of a linear condensation copolyester of ethylene glycol and a mixture of dicarboxylic acids comprising 82.0 to 84.0 mol percent terephthalic acid and 16.0 to 18.0 mol percent hexahydroterephthalic acid.

3. Fiber as defined in claim 1 having a load-bearing capacity at 7 percent elongation of at least 2.5 grams per denier.

References Cited

UNITED STATES PATENTS 3,051,212  8/1962  Daniels _____ 260—75
3,110,547  11/1962  Emmert _____ 260—75

FOREIGN PATENTS 1,261,056  4/1961  France.

WILLIAM H. SHORT, *Primary Examiner.*

LOUISE P. QUAST, *Examiner.*